United States Patent
Bensman

(10) Patent No.: US 10,277,737 B2
(45) Date of Patent: Apr. 30, 2019

(54) METHOD AND APPARATUS FOR DEFEATING COMPUTER-GENERATED, TELEMARKETING, AND ROBO-CALLS TO PHONES

(71) Applicant: Robert Michael Bensman, Bay Village, OH (US)

(72) Inventor: Robert Michael Bensman, Bay Village, OH (US)

( * ) Notice: Subject to any disclaimer, the term of this patent is extended or adjusted under 35 U.S.C. 154(b) by 0 days.

(21) Appl. No.: 15/246,590

(22) Filed: Aug. 25, 2016

(65) Prior Publication Data

US 2017/0099388 A1    Apr. 6, 2017

Related U.S. Application Data

(63) Continuation-in-part of application No. 14/876,077, filed on Oct. 6, 2015.

(51) Int. Cl.
*H04M 3/42* (2006.01)
*H04M 3/436* (2006.01)

(52) U.S. Cl.
CPC ......... *H04M 3/436* (2013.01); *H04M 3/4211* (2013.01); *H04M 3/42017* (2013.01); *H04M 3/42059* (2013.01)

(58) Field of Classification Search
CPC ............ H04M 3/4365; H04M 3/4283; H04M 3/42017; H04M 3/42059; H04M 3/4211; H04M 3/436; H04W 4/16
USPC .................... 455/412.1–422.1, 552.1, 550.2; 379/210.01, 221.14, 142.02, 210.02
See application file for complete search history.

(56) References Cited

U.S. PATENT DOCUMENTS

| | | | | |
|---|---|---|---|---|
| 7,212,620 B1* | 5/2007 | Mastro | ..... | H04M 1/57 379/134 |
| 8,094,800 B1* | 1/2012 | Smith | ..... | H04M 3/436 379/210.02 |
| 2003/0152199 A1* | 8/2003 | Kuhn | ..... | H04M 1/663 379/88.01 |
| 2008/0032687 A1* | 2/2008 | Mathewson | ..... | H04M 3/42042 455/423 |
| 2009/0086950 A1* | 4/2009 | Vendrow | ..... | H04M 3/493 379/210.02 |

(Continued)

*Primary Examiner* — Babar Sarwar
(74) *Attorney, Agent, or Firm* — Renner, Kenner, Greive, Bobak, Taylor & Weber Co., L.P.A.

(57) ABSTRACT

A system for defeating computer-generated, telemarketing, and Robo calls is provided. An originating switch receives a call from a calling party and determines a call route to a called party. The call is received at a destination switch and the profile of the called party is assessed. If the called party is not a subscriber to the system, the call is then passed or connected to the called party. If the called party is a subscriber to the system, a digital audio track is played back to the calling party. The audio track indicating a call failure that can be detected by the source of computer-generated, telemarketing, and Robo calls. The signals are of such a nature that the calling party would determine that the number is not a valid number and remove it from a calling list. If a called party is not a subscriber, the call simply continues to the called party without interjection of any digital audio track. The system also may require the entry of dual-tone multi-frequency signals by the calling party to differentiate from those calls to be terminated.

17 Claims, 4 Drawing Sheets

(56) References Cited

U.S. PATENT DOCUMENTS

| | | | |
|---|---|---|---|
| 2009/0282094 A1* | 11/2009 | Hawkins | H04L 51/12 709/203 |
| 2010/0157853 A1* | 6/2010 | Li | H04L 65/1079 370/271 |
| 2012/0015639 A1* | 1/2012 | Trivi | H04M 3/436 455/415 |
| 2012/0309365 A1* | 12/2012 | Wang | H04M 3/436 455/414.1 |
| 2014/0292768 A1* | 10/2014 | Tobin | G06T 13/80 345/473 |
| 2015/0087280 A1* | 3/2015 | Farrand | H04M 3/436 455/415 |
| 2015/0350399 A1* | 12/2015 | Feller | H04M 1/665 455/414.1 |
| 2016/0050316 A1* | 2/2016 | Jain | H04M 3/4365 379/221.14 |

* cited by examiner

METHOD AND APPARATUS FOR DEFEATING COMPUTER-GENERATED, TELEMARKETING, AND ROBO-CALLS TO PHONES

CROSS-REFERENCE TO RELATED APPLICATION

This application is a continuation-in-part of co-pending U.S. patent application Ser. No. 14/876,077, filed Oct. 6, 2015, entitled "Method and Apparatus for Defeating Computer-Generated, Telemarketing, and Robo-Calls to Phones."

TECHNICAL FIELD

The invention herein resides in the art of telephony, and more particularly to a method and apparatus for defeating or preventing automated calls placed to phones. More particularly, the invention relates to a method and apparatus for causing phone calls placed by predictive dialers, "Robo" telephone systems and the like to automatically terminate.

BACKGROUND OF THE INVENTION

Telemarketing is an ever-increasing problem for those wishing to use their telephones simply for private or business communications. Many people targeted by telemarketers do not want to receive such unsolicited calls and, accordingly, it is desired that an appropriate method and apparatus be employed to defeat such calls before they are apparent m the owner or user of the phone. While there are processes by which individuals can request that their telephone number be removed from dialing lists of telemarketers, the same has been found to be only marginally effective since there are currently many exceptions to Do Not Call (DNC) list compliance requirements and many telemarketing companies do not honor these do not call requests or federal, state or a company's DNC Lists. Additionally, "block number lists" are limited in the number of calling numbers that can be identified by the end user. Moreover, "blocking" is a function of the carrier (or the consumer using a white/black list device or app) matching the "blocked" number identified by the end user to an incoming call via Automatic Number Identification (ANI). If a telemarketer or Robo caller (TM/Robo) uses multiple lines with changing numbers to place the calls, the ANI changes and the number identified by the end user no longer matches, thus the TM/Robo call is completed to the end user and not blocked.

In the past, efforts have been made to provide systems for use in association with land-line phones introducing a Special Information Ione (SIT) when the phone is taken off hook, indicating to the originator of the call, if it is computer generated, that the phone that has been reached is not a viable one for the purpose of the call. Accordingly, the call is terminated. A system of that nature is shown in prior U.S. Pat. No. 5,920,623.

Present-day modern telecommunications switching networks must go far beyond simple determination of where a voice call must be directed in order for a communication to take place. Today, the telecommunications network must be intelligent enough to determine the type of communication desired, i.e., voice, data, video, or Voice Over Internet Protocol (VoIP) and be able to do the same routing and connecting functions as well as billing functions it had to do in the past. Further complicating the challenge for the intelligent network is the introduction of "mobile" or cellular technology, which further complicates the notion of origination of a "call" as well as determination of the destination of a "call." Today the intelligent network must also keep track of a myriad of "features" that an individual may have selected to subscribe to, insure that appropriate billing takes place, as well as assure that the features selected work properly.

In the prior art, such as U.S. Pat. No. 5,920,623, a physical device connected to the subscriber's phone, typically his or her home "land-line" phone, simply "answered" an incoming call on behalf of the subscriber and delivered supervisory tones such that if the calling party were one with whom the subscriber did not wish to speak, the device would cause the calling party's device to disconnect believing that the call could not be completed. The telephone network per se needed no special work or "conditioning" relative to call origination or completion in order for the system to do its work.

In a world where most consumers now utilize mobile or cellular phones or similar mobile devices where the physical connection of an accessory device is not practical, in order to accomplish the same "blocking" of annoying and potentially dangerous/criminal calls, a different scheme must be put in place in order to cause the same impact for the consumer.

While the backbone of telephone switching networks has changed link from land lines, the network elements are increasingly intelligent in that they can process calls faster and can access millions of individual subscriber "profiles" in order to deliver a vast set of feature functionality. Several of these critical elements include the Mobile Switching Center (MSC), which basically controls and identities calling access as coming from or to a mobile device versus a land line and an SCP (Service Control Point), which can determine exactly how and over what connective facilities a particular call request may transit.

There is a need for a system focused upon cellular or wireless and VoIP based calls and in which the MSC and the SCP have a direct impact on how the call is processed and therefore how and under what conditions the call from the caller to the called party may be interrupted before the subscriber's device rings, if, in fact, the subscriber has requested that the individual call be blocked, either generically or specifically. A particular desire for such a system would be the ability for the SCP to act upon calls in a unique fashion based upon preset rules and most especially to interact with peripheral devices or systems in the carrier network. This method is already demonstrated today in a carrier's ringback tone system from which a subscriber-selected audio track is played instead of the call progress ringing sound. If the SCP identifies the telephone subscriber as one who has subscribed to the RingBack service, it would route the call to the RingBack platform to play a ringback track prior to routing the call to the called party and would allow the RingBack system to perform its function before signaling the SCP to proceed to route the call to the called party's device.

Some telephone carriers today actually offer a call "blocking" service to their subscribers, but it is generally limited to blocking 12-100 specifically identified numbers (identified by the individual subscriber) and does not allow blocking an entire "class" of calls, such as those from what are commonly called "Robo" callers that call with advertising, promotions, requests to participate in surveys, and often political campaign messages, all of which calls are undesired by the subscriber. This blocking process is a manual process determined by the subscriber after a call has been received to block a specific number, thereby using one of the blocked number slots. Robo dialers frequently change their "called from" number to circumvent the blocked number functionality that will quickly fill all the available blocked number slots of a vigilant subscriber. The subscriber does not know which numbers to "unblock" and is quickly left with no number blocking functionality. While this existing capability could be expanded by the carriers, the carriers believe that the action of blocking should be the specific decision of the subscriber, not the carrier, and the individual databases that would be required would likely overwhelm the SCP, both in terms of volume and processing. While a modified blocking capability may be an option for Carriers who do not offer a Ringback peripheral device, the invention includes the provisioning of the Special Information Tones within the SCP database such that when the called party is identified as a mobile user, the automated TM/Robo call is denied in a fashion similar to the action of the Ringback system in this application.

This gives rise to the opportunity to cause the blocking in a peripheral device under the direction of the SCP, which is a standard component of the Intelligent Network (IN) telephone system, which is used to control the service between callers and the processing of calls. Standard SCPs in the telecom industry today are deployed using SS7, SIGTRAN or SIP technologies. The SCP queries the service data point (SDP), which holds the actual database and directory. The SCP, using the database from the SCP, identifies the destination number to which the call is to be routed. This is the same mechanism that is used to route 800 numbers.

SCP may also communicate with an intelligent peripheral (IP) to play voice messages, or prompt for information to the user or to the calling part), such as prepaid long distance using account codes or more recently King Hack tones that interact with the calling party before the call is completed to the called party. This is done by implementing telephone feature codes like (the pound sign), which can be used to terminate the input for a user name or password or can be used for call forwarding, selective ringing or a number of other carrier-provided features. These are realized using Intelligent Network Application Part (INAP) that sits above Transaction Capabilities Application Part (TCAP) on the SS7 protocol stack. The TCAP is part of the lop or 7th layer of the OSI layer breakdown.

SUMMARY OF THE INVENTION

Against this backdrop of present-day telephonic systems, an appreciation can be obtained as to the implementation of a method and apparatus for preventing computer-dialed and Robo-dialed telemarketing calls to a variety of telephonic devices, and particularly cellular phones and VoIP phones.

Indeed, it is an aspect of the invention to provide a method and apparatus for preventing telemarketing calls to cellular phones and VoIP phones that is substantially undetected by a called party.

It is another aspect of the invention to provide a method and apparatus for preventing telemarketing calls to cellular phones and VoIP phones that in generally adaptable to all presently known telephonic systems.

Still a further aspect of the invention is the provision of a method and apparatus for preventing telemarketing calls to cellular phones and VoIP phones that can be readily implemented with state-of-the-art hardware and techniques.

The foregoing and other aspects of the invention that will become apparent as the detailed description proceeds are achieved by a method for defeating computer-generated telemarketing and Robo calls to phones, comprising the steps of: having an originating switch receive a call from a calling party and determining a call route to a called party; receiving said call at a destination switch and assessing a profile of the called party; passing said call to said called party if said profile indicates that said called party is not a subscriber to the method; and playing a digital audio track back to said calling parts if said called party is a subscriber to the method, said digital audio track indicating a call failure to computer-generated and Robo calls.

Other aspects of the invention that will become apparent herein are achieved by a method for defeating computer-generated telemarketing and Robo calls to phones, comprising the steps of: a calling party places a call to a called party; determining if said called party is a subscriber to the method and if not, completing said call from said calling party to said called party; and if said called parts is a subscriber, playing a sound track to said calling party, said sound track indicating to a telemarketer, computer, and Robo dialer that the called parts is not a viable number, said call being terminated if the calling party is one of the group, telemarketer, computer or Robo dialer.

DESCRIPTION OF DRAWINGS

For a complete understanding of the various aspects of the method and apparatus of the invention, reference should be made to the following detailed description and accompanying drawings, wherein.

BEST MODE AND PREFERRED EMBODIMENT OF THE INVENTION

Figure 1:
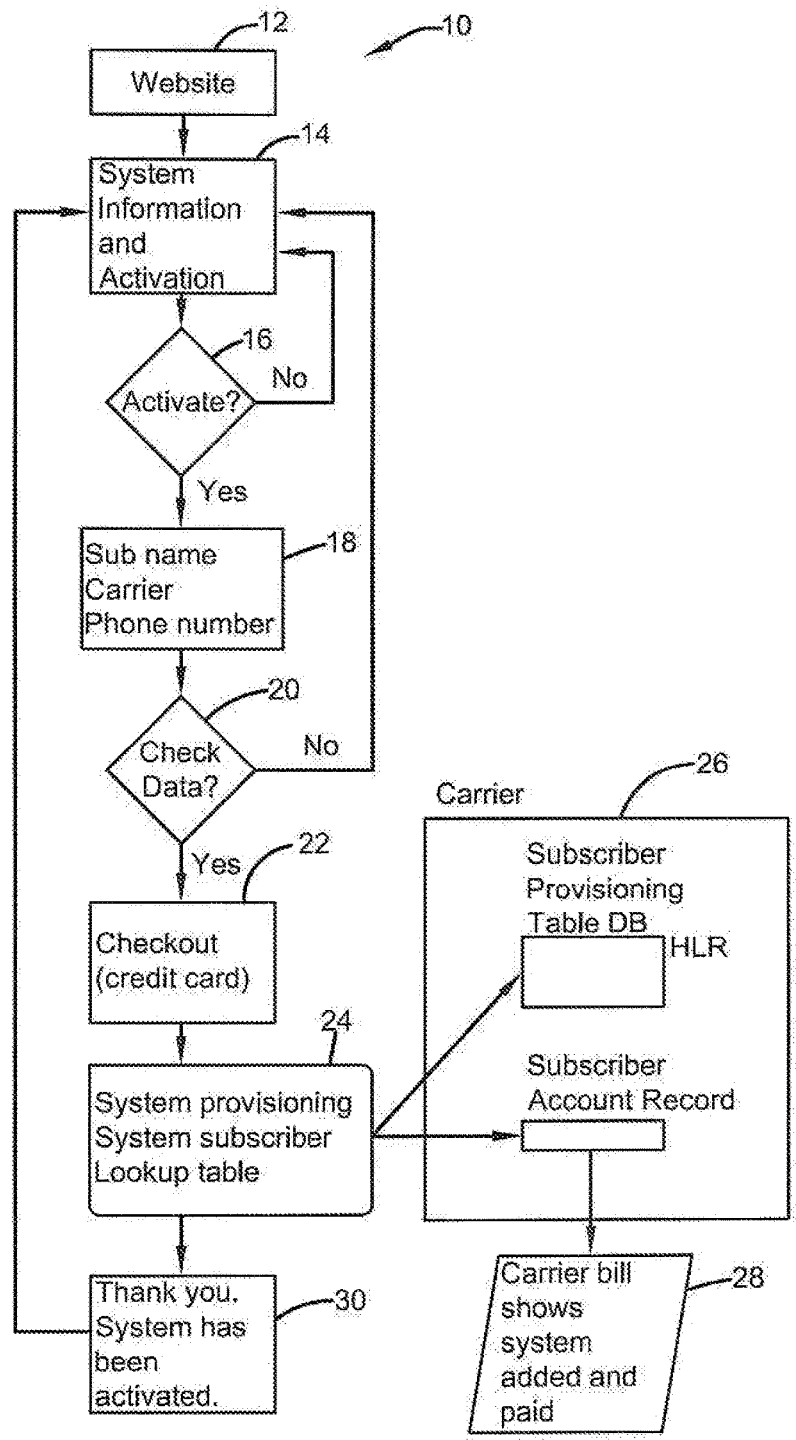
FIG. 1 illustrates the steps utilized for one to access and employ the benefits of the invention from a website of a provider of said service.

Referring now to the drawings and more particularly FIG. 1, the methodology for subscribing to a system for preventing telemarketing calls in accordance with the invention is designated generally by the numeral 10. FIG. 1 discloses such a method from the website of a provider of the service. An intended subscriber visits the website at 12, accesses and assesses carrier availability, pricing and method of activation at 14, and makes a determination at 16 whether to subscribe or activate the service. Upon election to activate at 16, the subscriber presents his/her name, the telephone carrier used by the subscriber, and the subscriber's phone number, all of which is required for activation. At 20, the system checks the data provided in 18 and loops until such data is provided and accurate. At that point, the subscriber is directed at 20 to a checkout page 22 where credit card information is processed. The processing of such method for payment continues until complete, at which time the subscriber's information is gathered and access is made to the carrier's subscriber list and account records through an appropriate carrier firewall at 24. A determination is nude at 26 as to whether the subscriber is in good standing with the carrier and the subscriber's request is dented and the customer is alerted if such is not the case. If the customer is in good standing with the carrier, the requested service is added as a feature provided to the subscriber through the carrier and an appropriate feature code and billing information is added to the subscriber's account record. The carrier's bill to the subscriber will thereafter show the amount charged for the subscribed service in all future billings as at 28. The subscriber is notified of acceptance and service activation at 30. The system then reverts back to await accessing by the next subscriber at 14.

Figure 2:
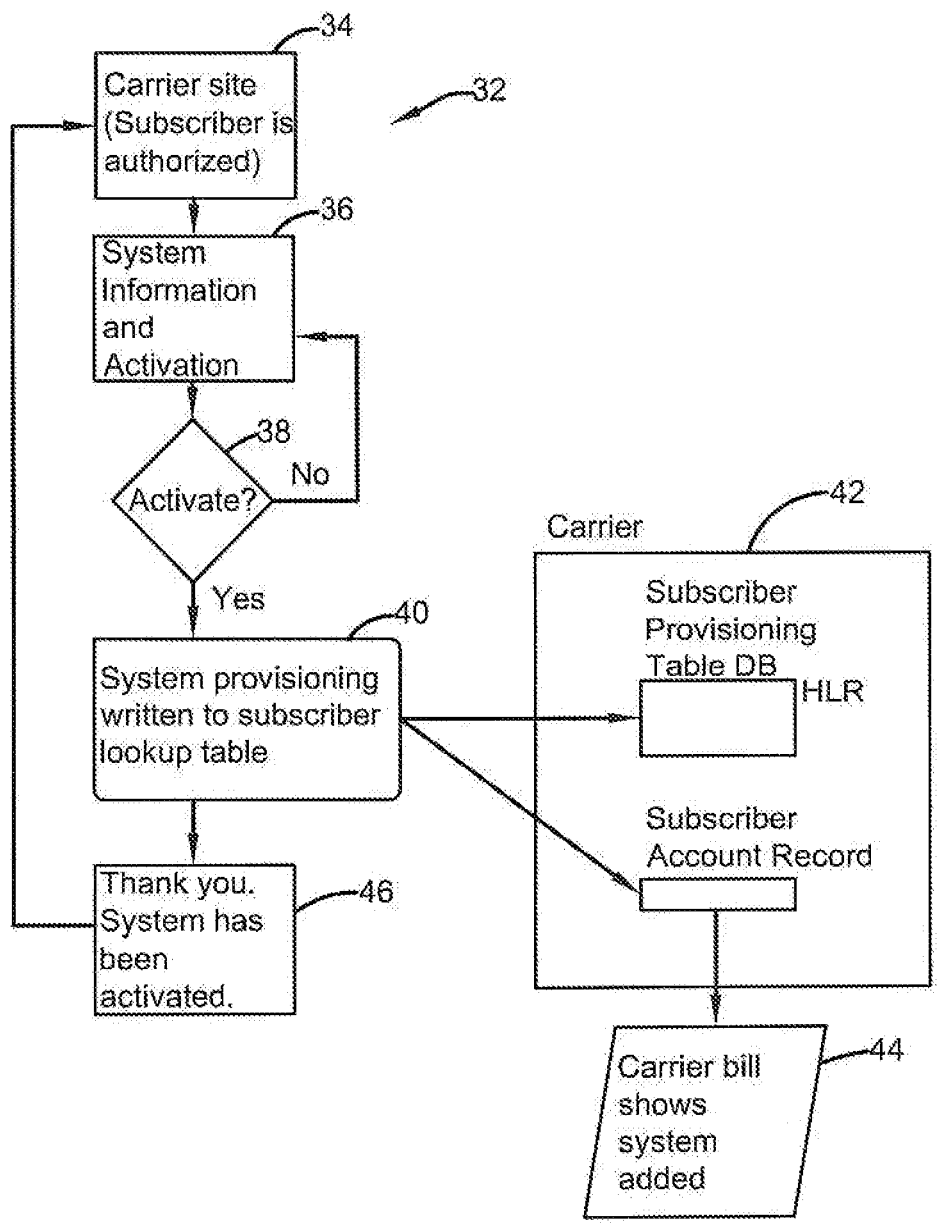
FIG. 2 presents the steps employed by one seeking to subscribe to the utilization of the method and apparatus of the invention from the website of a telephone service carrier/provider.

It is also contemplated that a subscription to the service of the invention can be made from the website of an individual's carrier. With reference to FIG. 2, it can be seen that such a system is designated generally by the numeral 32. Here, a subscriber may visit a carrier website at 34 and link to a page for system information and activation of the system for preventing telemarketing calls as at 36. Should the subscriber elect at 38 to subscribe to the telemarketing prevention system, the subscriber's information is assembled at 40 and added to the carrier's records at 42 where the subscriber's identity and relevant information is added to an appropriate database of subscriber's serviced by the carrier, and an account record is generated. Thereafter, the carrier's bill to the subscriber will show that the service for preventing telemarketing calls has been added at an appropriate charge, as indicated at 44. At 46, the subscriber is thanked and assured that the requested service has been activated through the carrier.

Figure 3:
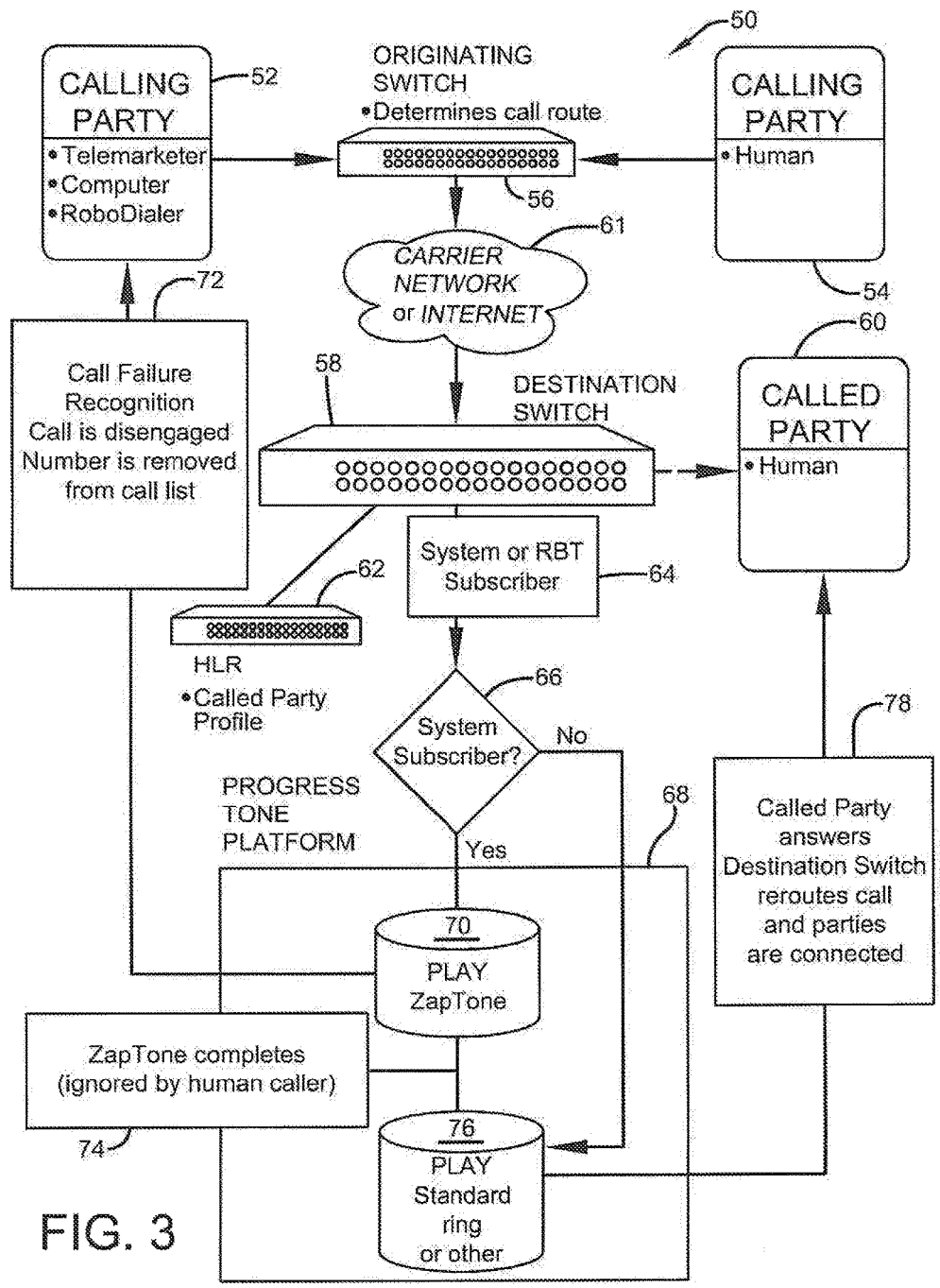
FIG. 3 illustrates the processing of a telephone network call employing the concept of the invention.

With reference now to FIG. 3, an appreciation can be obtained with regard to the telephone network call flow methodology of a system employing the concept of the invention. The flow process is designated generally by the numeral 50. Here, a calling party 52, such as a telemarketer, computer, or Robo dialer places a call. While the invention focuses on (automated or computer generated) calling parties, it will also be understood that the calling parts may be a human using a cell phone, land line or the like as at 54. At the originating switch 56, a determination is made as to the destination for the call and the system looks ahead to the destination switch 58 to determine the best routing path for the call to reach the called party 60, which is typically a human. It will be appreciated that the destination switch 58 is the terminating or "home" switch for the called party 60. Processing between the originating switch 56 and the destination switch 58 is through either the carrier network or the Internet 61.

The home switch or destination switch 58 examines the subscriber profile of the called party 60 at the home location register (HLR) 62 to determine how to set up and deliver the call based upon the subscriber's individual profile. In this regard, it will be appreciated that the home switch must determine if the subscriber has Call Forwarding Activate and send the call to another number that could be controlled by another home switch. At 64, if the home switch 58 has determined that the called party 60 has subscribed to the system of the invention or to the carrier's RingBack Tone Service (RBTs), the home switch diverts the call to the carrier's progress tone platform (or RBT platform) for processing. If the called party has not subscribed to either the system of the invention or RBTs, then the phone switch 58 processes the call based upon other profile criteria and delivers the call to the called party 60 accordingly.

A determination is made at 66 as to whether the called party is a subscriber to the system of the invention or not. In either case, the call passes to the progress tone platform 68, as shown. When the progress tone platform 68 receives the call, it examines the subscribers profile to ensure that the correct progress tone track or digital audio track is played to the calling party before continuing the call deliver) processing. This is controlled by the automatic number identification (ANI) of the calling party, which is delivered to the platform 68 from either the originating switch 56 or the destination switch 58 in the network. Concurrently, an outgoing call to the called party 60 is placed through the destination switch 58.

If the called party 60 is a subscriber to the system of the invention as determined at 66, the platform 68 will play an appropriate digital audio track or "Zap Time" at 70. It will be appreciated that a Zap Tone in the context of the invention is a series of audible and/or inaudible sound frequencies designed to signal the computer equipment used by telemarketing and Robo calling companies and indicate that the called party phone is either busy, disconnected, or otherwise unavailable for connection, which typically will prompt a call failure recognition at 72, causing the calling party device 52 to terminate or abandon the call attempt, thus effectively "blocking" the call from reaching the called subscriber. The network will recognize this call abandonment and treat it as an incomplete or disengaged call and take down the call connection attempt. It is particularly noteworthy that this occurs prior to completion of the call to the called party 90 and is effective even if the subscriber's phone is turned off or if the subscriber is on another call. In other words, the system processing is automatic on every call prior to any indication to the called party subscriber that a call is inbound.

After the Zap Track Tone at 70 has been completed, and if the call has not been terminated, the platform 68 will play the call progress tone—a standard ringing tone—or the appropriate provisioned RBT (if the subscriber has RBT service) until the call is answered. Those skilled in the art will appreciate that RBT is a RingBack Tone system, which is a configuration of equipment and interconnections to a Telecommunications Carriers Network that allows for the interruption of a call prior to its final domination and the interjection of an audio track containing a message or music content that is played to the calling party instead of the standard ringing sound before the called party answers the incoming call.

It will be appreciated that if the Zap Truck Tone played at 70 does not terminate the call as at 72, the Zap Track Tone is completed at 74 and standard ring tones or other tones may be played at 76. Those skilled in the art will appreciate that the Zap Tones are ignored by the human caller to whom the call is directed in the absence of a call termination at 72.

If the called party answers as at 78, the destination switch 58 detects the answer. Using SS7 signaling, instructions are sent to the destination switch or home switch 58 for an RLT trunk release. Those skilled in the art understand that SS7 signaling refers to a set of telephony signaling protocols, which were developed in the 1970s and are used to control the set-up and tear-down of most of the world's public switched telecommunications traffic. The SS7 system controls number translation, enables billing, performs Short Message Service (SMS) transport (testing) and other mass-media services. The called party 60 answers, or the call is routed to the called party's voicemail, the destination switch 58 detects the answer. Again, using SS7 signaling, instructions are sent to the destination switch for a Release Link Trunk RLT. The destination switch 58 re-routes the call, connecting the legs of the calling party 52 or 54 and the called party 60.

It has been found that just generating a disconnect tone or signal is not always efficient in achieving a disconnect. More sophisticated Robo callers and the like may require more than the detection of such a tone. Accordingly, it is desirable to require the calling party to generate a DTMF signal for detection and verification.

Figure 4:
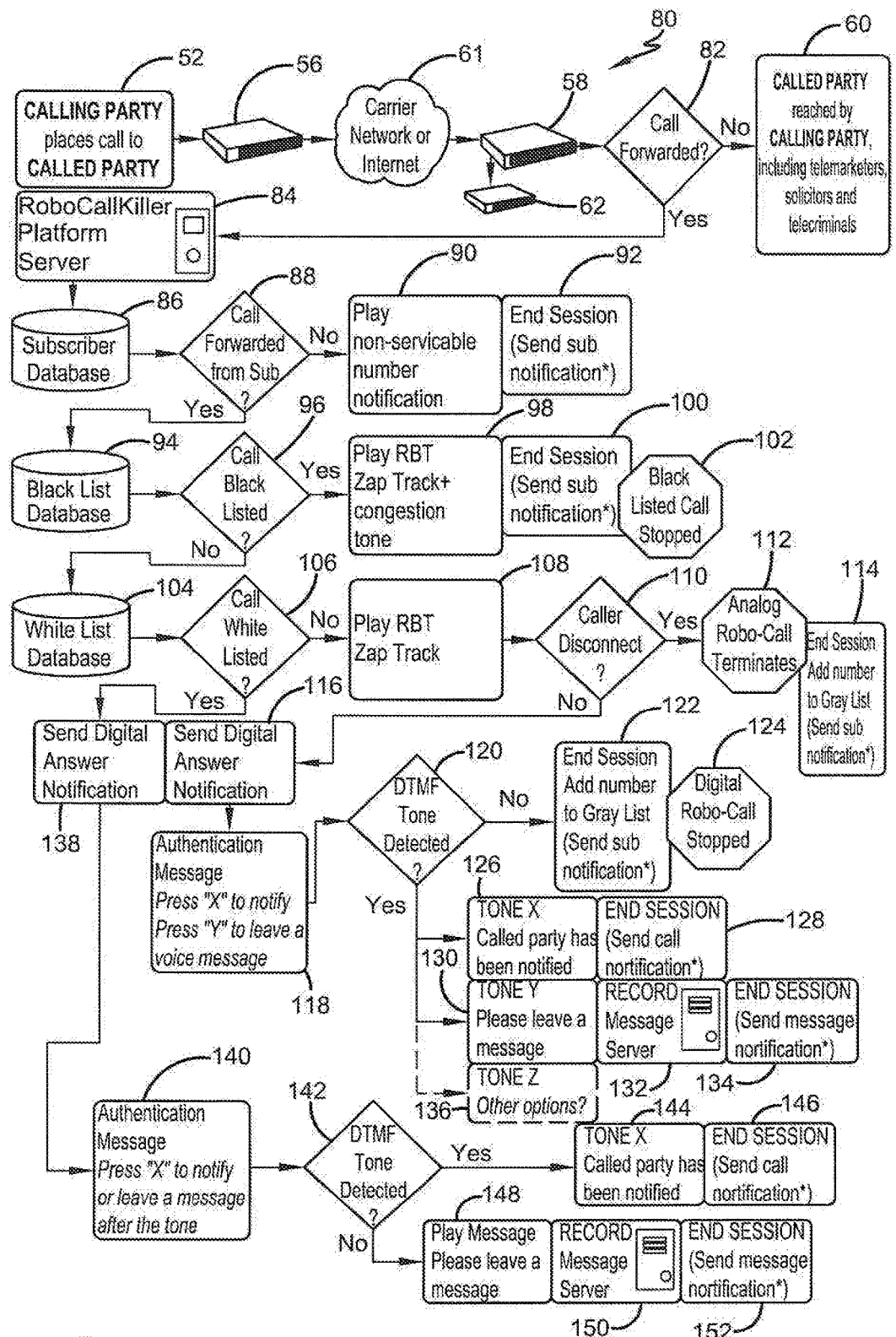
FIG. 4 illustrates a call flow diagram of increased effectiveness, requiring a calling party to enter a dual-tone multi-frequency (DTMF) signal for detection and verification.

With reference now to FIG. 4, an appreciation can be obtained of a call flow diagram of a free-standing, non-carrier solution to assist for defeating telemarketers, solicitors. Robo calls and the like. The system is designated generally by the numeral 80. Again, a calling party places a call to a called party at 52. At the originating switch 56, a determination is made as to the destination for the call and the system again looks ahead to the destination switch 58 to determine the best routing path for the call to reach the called party 60, which again is typically a human. As before, the processing between the originating switch 56 and the destination switch 58 is through either the carrier network or Internet 61. At the destination switch 58, a server looks up the called party profile or home location register (HLR) 62 and determines if the called party is a current subscriber to the service of the invention, what features and the like are enabled and conditions the system for servicing the call.

If the called party is not a subscriber, the call is passed through decision block 82 directly to the called party 60. The same is true even if the called party is a subscriber and has not elected to forward calls through the system as at 82. If, however, the called party is a subscriber and forwarding has been requested, the call is forwarded at 88 to the platform server 84. Here, the system begins to process the incoming call while providing a "ringing" sound to the calling party 52 while the processing continues. The subscriber database 86 is accessed and a determination is made at 88 as to the subscriber's current status. If not a non-serviceable number notification is played at 90. The call is terminated at 92 with a notification being sent to the subscriber that incoming calls are being terminated and if the subscriber does not want that to continue to happen, the subscriber needs either to turn off the system and notify the operator or bring the subscription current on payments as at 92.

If, however, the subscriber's status is "active and authorized," the call is forwarded at 88 to the blacklist database at 94. Here, a determination is made as to whether the call is blacklisted or to be blocked. With that determination being made at 96, a specialized or customized call progress tone or appropriate ringback tone is generated at 98, indicating that the phone is either disconnected or otherwise out of service. As a consequence, the call is ended at 100 and the subscriber is notified of that action. The result is a termination of the blacklisted call at 102. It will be appreciated that the blacklist database at 94 can be either a national database of Robo callers or the like that is generated and maintained by the system provider and/or it may include a personal blacklist that is generated and input by the subscriber. In any event, the blacklisted database is typically advised that the telecommunications system of the called party is either inoperative or out of service such that the Robo caller, telemarketer, or the like will remove the number from its database.

If the determination is made at 96 that the calling party is not blacklisted, the call passes to check whether or not it is on a whitelist database at 104. This whitelist or "green" list contains a list of phone numbers dial may be coming from Robo callers or the like, but which the called party desires to receive. These may be Robo calls from schools, doctors, pharmacies, employers, or the like. When the whitelist database 104 is checked at 106, if the determination is made that the calling parry is not on the whitelist, a customized or specialized digital audio track is played at 108 advising the calling party, by means of an appropriate tone, that the phone of the called party is out of service, inactive, or the like. The caller is disconnected at 110 and the analog Robo call is terminated at 112. The session is ended at 114, with the calling number being added to a gray list and a notification is sent to the subscriber as at 114.

If the determination is made at 110 that the call is not to be disconnected as a result of the calling party being neither blacklisted nor whitelisted, a digital answer notification is sent to the calling party at 116, and thereafter an authentication message is played at 118. The authentication message leases the calling pans with, for example, two options. The first directs the calling party to press a first number "X" to notify the called party that the calling party has attempted to receive him/her, or to press a second number "Y" for the calling party to leave a voice message. If a dual-tone multi-frequency (DTMF) signal is not detected at 120, such indicates that the calling party was not a real person, but rather a computer, telemarketer. Robo caller or the like. Accordingly, the determination is made at 122 to end the session, add the calling number to a gray list for further processing, and send the subscriber of the same. The digital Robo call is stopped at 124.

If, however, a DTMF tone is detected, one of two processes is engaged, depending upon whether the calling party pressed either "X" or "Y." If the DTMF signal for "X" is detected at 126, the calling party is advised that the called parts has been notified of the attempt to call and the session is terminated at 128 with notification being sent to the subscriber. If tone "Y" is sensed at 130, the calling party is requested to leave a message, the message is recorded at 132, and the session is ended at 134 with the message being sent to the subscriber.

The invention also contemplates that other tones "Z" may be employed and assessed for other functions, as indicated at 136.

If it is determined at 106 that the calling party is whitelisted, a digital answer notification is sent to the calling party at 138 and an authentication message 140 is played. Since this path deals with whitelisted Robo callers or other authorized callers, at 140 it directs either the generation of a specific DTMF tone by the caller or accommodates a passage of time for leaving a message, which may be a pre-recorded message of a Robo caller. If a DTMF tone is detected at 142, the system notifies the caller of the receipt of the call at 144, and then ends the call and notifies the called party at 146. If no DTMF signal is detected at 142, a message if played to the calling party requesting that a message be left at 148. The message left by the calling party is recorded at 150 and the call is ended and notification sent to the calling party at 152.

Thus, it can be seen that the various aspects of the invention have been satisfied by the system presented and described above. Prior to reaching a subscriber, each call to a subscriber is subjected to a digital track of signals prompting a call failure recognition by computer-generated or telemarketing Robo calls, defeating the call by prompting a disconnect before the called subscriber is even aware that the call has been placed.

While in accordance with the patent statutes, only the best mode and preferred embodiment of the invention has been presented and described in detail, the invention is not limited thereto or thereby. Accordingly, for an appreciation of the scope and breadth of the invention, reference should be made to the following claims.

What is claimed is:

1. A method for defeating computer-generated telemarketing and Robo calls to phones, comprising the steps of: having an originating switch receive a call from a calling party and determining a call route to a called party; receiving said call at a destination switch and determining whether said called party is a subscriber to the method; passing said call to said called party when it is determined that said called party is not a subscriber to the method; and when it is determined that said called party is a subscriber to the method, automatically playing a digital audio track back to said calling party independently of the identity or status of said calling party as being a source of computer-generated telemarketing or Robo calls, said digital audio track indicating a call failure to computer-generated and Robo calls, such that said computer-generated and Robo calls are terminated upon receipt of signals from said digital audio track by said calling party and the called phone number of said called party is removed from a call list of said calling party.

2. The method for defeating computer-generated telemarketing and Robo calls to phones according to claim 1, wherein said digital audio track produces telephony signals from the group of "out of order," "disconnected," and/or "not a working number".

3. The method for defeating computer-generated telemarketing and Robo calls to phones according to claim 1, wherein signals from said digital audio track are ignored by said called party when said called party is a human.

4. The method for defeating computer-generated telemarketing and Robo calls to phones according to claim 3, wherein said digital audio track completes playing if said call has not been terminated and a phone at said called party is caused to ring.

5. The method for defeating computer-generated telemarketing and Robo calls to phones according to claim 4, wherein said destination switch connects said calling and called parties.

6. A method for defeating computer-generated telemarketing and Robo calls to phones, comprising the steps of: a calling party places a call to a called party; a determination is made whether said called party is a subscriber to the method and, when not, said call from said calling party to said called party is completed; and when it is determined said called party is a subscriber, a sound track is automatically played to said calling party independently of the identity or status of said calling party as being a source of computer-generated telemarketing or Robo calls, said sound track indicating to a telemarketer, computer, and Robo dialer that the called party is not a viable number, said call being terminated by said calling party upon receipt of said sound track and the called phone number of said called party being removed from a call list of said calling party when the calling party is one of the group of telemarketer, computer or Robo dialer.

7. The method for defeating computer-generated telemarketing and Robo calls to phones according to claim 6, wherein, if the call is not terminated by the calling party, the phone of the called party is caused to "ring" and, when the called party answers, the called and calling parties are connected.

8. The method for defeating computer-generated telemarketing and Robo calls to phones according to claim 7, wherein said sound track emits signals that are ignored by human called parties.

9. The method for defeating computer-generated telemarketing and Robo calls to phones according to claim 6, further comprising the step of determining if the calling party is on a black list of parties whose calls are to be defeated and terminating the call if the calling party is on the black list.

10. The method for defeating computer-generated telemarketing and Robo calls to phones according to claim 9, further comprising the step of determining if the calling party is on a white list of parties whose calls are to be accepted even if the calling party is a telemarketer or Robo caller, and terminating the call if the calling party is not on a white list.

11. The method for defeating computer-generated telemarketing and Robo calls to phones according to claim 10, where, if the call is an analog Robo call, the call is terminated by playing a ringback tone.

12. The method for defeating computer-generated telemarketing and Robo calls to phones according to claim 11, wherein if the call is not terminated by playing a ringback tone, the calling party is instructed to enter a dual-tone multi-frequency (DTMF) signal and, if such DTMF signal is not entered, the call is terminated.

13. The method for defeating computer-generated telemarketing and Robo calls to phones according to claim 12, wherein the called party is notified if such dual-tone multi-frequency (DTMF) signal is entered.

14. The method for defeating computer-generated telemarketing and Robo calls to phones according to claim 13, wherein a specific notification to the called party is determined by the dual-tone multi-frequency (DTMF) signal.

15. The method for defeating computer-generated telemarketing and Robo calls to phones according to claim 14, wherein said specific notification is taken from the group of (1) notifying the called party of the attempted call by the calling party and (b) delivering to the called party a message recorded by the calling party.

16. The method for defeating computer-generated telemarketing and Robo calls to phones according to claim 10, wherein if the calling party is on the white list, the calling party is instructed to leave a message.

17. The method for defeating computer-generated telemarketing and Robo calls to phones according to claim 16, wherein the called party is notified of receipt of the recorded message.

* * * * *